Jan. 29, 1957     H. M. STINE     2,779,712
CONTINUOUS PROCESS FOR THE REMOVAL OF MERCAPTANS
FROM HYDROCARBONS AND APPARATUS THEREFOR
Filed Oct. 23, 1953
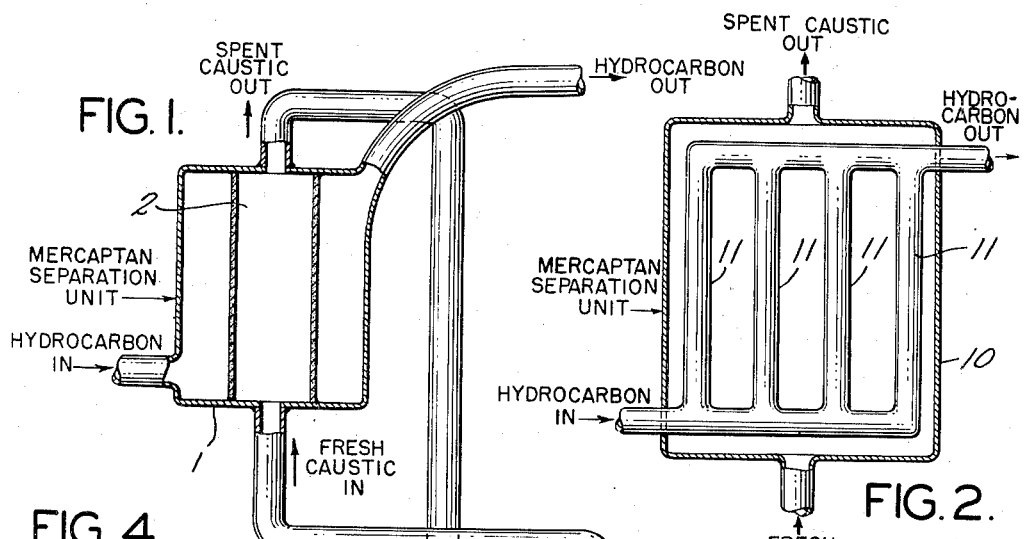
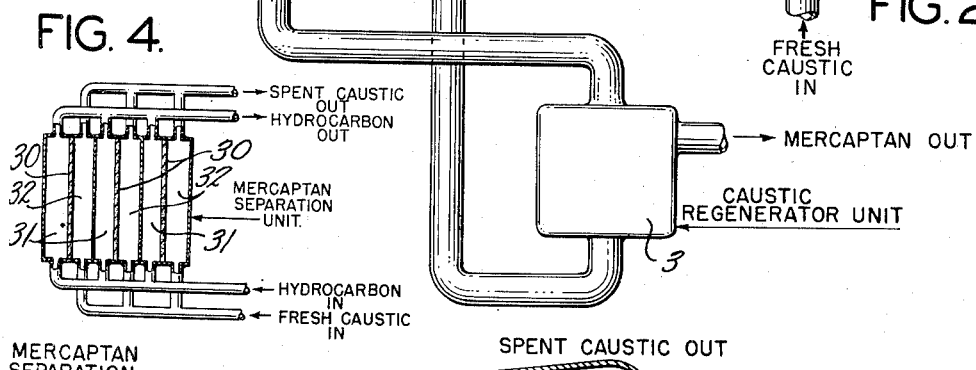
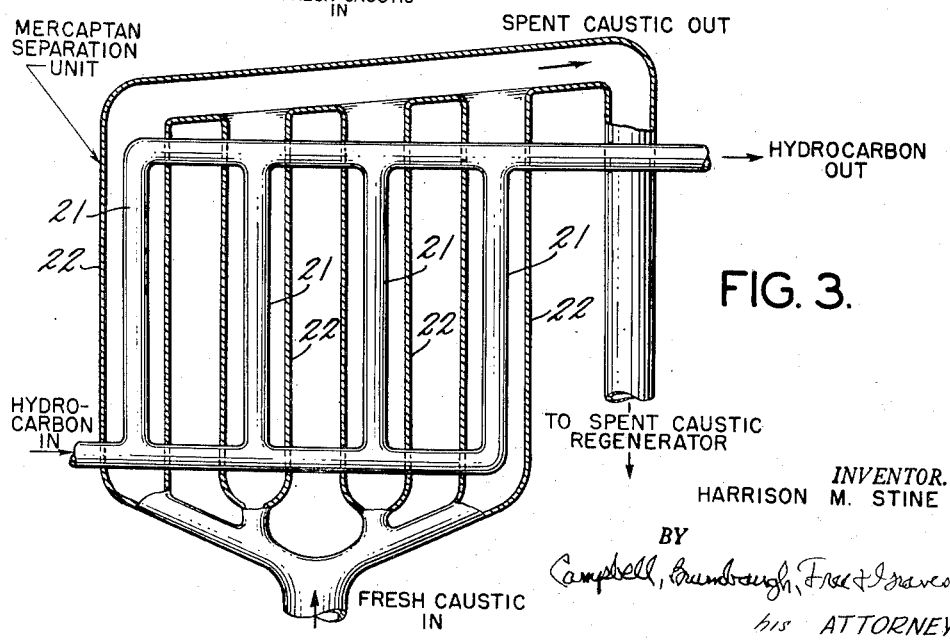
INVENTOR.
HARRISON M. STINE
BY
*his* ATTORNEYS

United States Patent Office 2,779,712
Patented Jan. 29, 1957

2,779,712

CONTINUOUS PROCESS FOR THE REMOVAL OF MERCAPTANS FROM HYDROCARBONS AND APPARATUS THEREFOR

Harrison M. Stine, Lyndhurst, Ohio, assignor to The Standard Oil Company, Cleveland, Ohio, a corporation of Ohio Application October 23, 1953, Serial No. 387,977

13 Claims. (Cl. 196—32)

This invention relates to a process and apparatus for the treatment of hydrocarbon stocks, particularly light petroleum distillates, in order to separate mercaptans therefrom.

Small quantities of mercaptans are nearly always present in cracked naphthas and light petroleum distillates. Mercaptans have an objectionable odor and other undesirable properties and it is customary either to remove a portion of them by caustic soda solution, transforming the remainder by a special oxidation procedure called "sweetening" into the less odoriferous alkyl disulfides which remain dissolved in the oil, or to remove them from the oil quantitatively by extraction. It has not however been possible to effect a quantitative removal of the mercaptans with aqueous caustic solution by the conventional procedures because the extent and facility with which mercaptans will react with a caustic solution depends upon a number of factors. The solubility of the mercaptans in the hydrocarbon phase and in the caustic phase, the molecular weight of the mercaptan, and the concentration of the mercaptan in the respective phases, all are of importance. The reaction of the mercaptan with the caustic is reversible and accordingly as the concentration of mercaptan in the alkali increases the reaction tends to reach an equilibrium before the reaction has been completed:

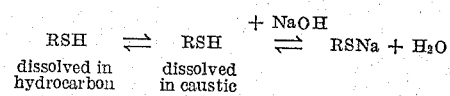

$$\text{RSH} \rightleftharpoons \text{RSH} \xrightleftharpoons{+ \text{NaOH}} \text{RSNa} + \text{H}_2\text{O}$$
dissolved in hydrocarbon ; dissolved in caustic It is evident from this equation that if the concentration of mercaptides dissolves in the caustic can be kept at a low level the reaction will have a tendency to proceed to the right which is the desired direction and a better removal of the mercaptans from the hydrocarbon will follow.

In U. S. Patent No. 2,577,824 to Harrison M. Stine, dated December 11, 1951, a process is set forth describing the treatment of petroleum distillates with a charcoal adsorbent which has been treated with an aqueous solution of caustic soda. In this process a column is packed with the charcoal caustic adsorbent and the hot liquid hydrocarbon is passed through the column at an appropriate rate. The charcoal functions as an adsorbent for the mercaptides which are formed by reaction of the caustic soda with the mercaptans. However, in due course the charcoal-caustic adsorbent becomes exhausted and it is then necessary to halt the reaction and regenerate the column. Thus although the process can be operated in a continuous manner for a long period of time, essentially it is an intermittent operation.

In accordance with the instant invention, apparatus is provided which makes it possible to carry out a caustic soda extraction process such as is described in U. S. Patent No. 2,577,824 in a continuous manner without the need for halting the operation from time to time. The apparatus in its essentials comprises a microporous carbon layer, means for flowing a mercaptan-containing hydrocarbon stock such as a light petroleum distillate in contact with one surface of the layer, and means for flowing an aqueous alkali metal hydroxide solution (referred to frequently hereafter as caustic) in contact with another surface of the layer, and, desirably, means for regenerating spent caustic solution and recycling it. The term "microporous" means that the carbon layer has an average pore diameter approximating that of a capillary, i. e., about 1 mm., or less, so that the layer is capable of absorbing and retaining a liquid, but passes a liquid so slowly that it can serve as a barrier between two liquids.

The microporous carbon layer also is hydrophylic and absorbs caustic solution in preference to the hydrocarbon stock. Consequently the microporous carbon layer becomes saturated with the caustic solution and the surface in contact with the hydrocarbon layer actually is wet with caustic. Mercaptans present in the hydrocarbon layer react with the caustic to form soluble mercaptides and these diffuse through the caustic solution in the carbon layer to its other surface. Here they are caught up in the flow of caustic solution and carried off. In this way mercaptides are continuously carried away from the surface in contact with the carbon layer as they are formed so that the concentration of the mercaptides in the caustic is kept low, the exact concentration depending upon the relative rates of reaction and mercaptide diffusion through the carbon layer and the rates of flow of hydrocarbon and caustic across the surfaces of the carbon layer. In this way conditions can be so maintained that a large or even quantitative proportion of mercaptan will be extracted from the hydrocarbon stock.

Thus the process adapted for continuous operation for the separation of mercaptans from hydrocarbon stocks such as light petroleum distillates comprises flowing the distillates in contact with one surface of a microporous carbon layer wet with aqueous alkali metal hydroxide solution, flowing an aqueous alkali metal hydroxide solution over another surface of the layer, recovering the hydrocarbon stock of diminished mercaptan content on the one side of the layer, regenerating the spent aqueous alkali metal hydroxide solution and recycling the alkali metal hydroxide.

For greater efficiency it is desirable to pass the hydrocarbon stock across the microporous carbon layer in turbulent flow so as to increase the opportunity of the mercaptans therein for contacting the aqueous caustic solution.

The microporous carbon layer can take any of several forms. Flat sheets of microporous carbon can be used and these can be placed in a large tank, dividing the tank into one or more compartments. The hydrocarbon stock and the aqueous caustic solution are flowed through alternate compartments. The microporous carbon layer also can be in form of a tube which can be placed concentrically within a larger tube or which can be placed in a tank. The caustic or the hydrocarbon stock is passed through the tube, and the other solution passed on the outside of the tube, through the outer tube or the tank, as the case may be. The tubes can be of any desired shape, circular, square, or fluted in cross-section. It may be desirable in the commercial application of the invention to use a multiplicity of tubes or compartments.

Porous carbon pipes which can be used in the invention are available commercially from the National Carbon Company and are sold under the trademark "Karbate." The tubes range from ⅝ to 3¾ inch in inside diameter and the size of the pores in the walls of the tubes ranges from 0.0013 to 0.0075 inch in diameter, respectively. The average permeability of these tubes to water ranges from 14 gal./sq. ft./min. for the 0.0013 inch pore size at 5 p. s. i. g. to 175 gal./sq. ft./min. for the 0.0075 inch pore size.

Fig. 1 is a view of a typical apparatus for continuous operation in accordance with the invention, including a mercaptan separation unit and a caustic regeneration unit;

Fig. 2 is a schematic view of a mercaptan separation unit containing a multiplicity of tubes disposed in a tank.

Fig. 3 is a schematic view of a mercaptan separation unit composed of a multiplicity of concentric tubes.

Fig. 4 is a schematic view of a mercaptan separation unit composed of a multiplicity of microporous carbon sheets.

In Fig. 1 the mercaptan separation unit comprises a tank 1 in which is disposed a tube separation unit composed of a concentric tube 2 of microporous carbon. The hydrocarbon stock is flowed around the outside of the tube, and the caustic solution is flowed through the interior of the tube. Spent caustic emerging from the separation unit is conducted to a caustic regenerator unit 3 where mercaptans are removed and then recycled to the base of the separation unit tank.

In Fig. 2 the mercaptan separation unit tank 10 is shown schematically as provided with a multiplicity of tubes 11 whose walls are of microporous carbon. In the arrangement shown, the hydrocarbon stock is passed through the center of the tubes and the caustic flows about their exterior, but this could be reversed.

It would also be possible to employ a multiplicity of concentric tubes as illustrated schematically in Fig. 3, the walls of the inner tubes 21 being of microporous carbon and the walls of the outer tubes 22 being of impermeable material, such as steel. Instead of as shown, the caustic soda can be flowed through the inner tubes 21 and the hydrocarbon stock through the outer tubes 22, if desired.

The unit schematically shown in Fig. 4 utilizes sheets of microporous carbon 30. The caustic soda is flowed through the chambers 31 and the hydrocarbon stock is flowed through the alternate chambers 32.

The concentration of the aqueous alkali metal hydroxide solution is not critical and will vary depending upon the proportion and type of mercaptans present in the hydrocarbon stock and upon the caustic used. Any alkali metal hydroxide is satisfactory. Sodium hydroxide is the least expensive and most readily available and it would usually be used. Potassium hydroxide is useful in some instances despite its cost because it also has a tendency to remove elemental sulfur from the oil and is more reactive with some mercaptans. A mixture of sodium and potassium hydroxides has certain advantages. For some purposes, sodium carbonate is an equivalent of sodium hydroxide.

The concentration of alkali should usually be determined experimentally. A strong solution is more convenient to use for neutralization of oil acidic substances than a weak solution but a dilute solution having a concentration of 5% to 15% alkali metal hydroxide generally is more economical. Solutions as strong as 35° Baumé (28 to 29%) are not uncommon because such solutions dissolve the soaps with greater ease. Because of the apparatus employed there is very little tendency to form emulsions when strong caustic solutions are used.

The process is applicable to hydrocarbon stocks of all kinds, such as gasoline, kerosene, other light petroleum distillates and lubricating oils. Usually the treatment would be applied to lubricating oils after acid treatment without first washing the acid oil with water since this will be cared for by treatment with the alkali. Acid-treated light petroleum distillates usually would be washed with small quantities of water before the caustic treatment.

The temperatures of treatment with alkali solutions likewise are not critical. High temperatures are much less detrimental to color than the acid treatment of oils and it is often possible to treat the oil and alkalies at temperatures of 212° F. or even higher without injuring the oil. The process will however proceed at room temperature and this would usually be used commercially. A temperature of 50 to 225° F. will generally be employed and the process has the advantage of being capable of operation at temperatures of gasoline normally encountered in a refinery at the time of mercaptan removal, that is, from 70 to 120° F.

The respective rates of flow should be adequate to permit removal of as high a proportion of mercaptans as is possible. This will depend upon the apparatus, since a greater surface area for reaction will permit higher rates of flow. The rate of flow of caustic will be sufficient to carry off mercaptans as rapidly as possible and maintain a very low concentration of mercaptide.

The flow rate is adjusted to the permeability of the porous pipe or tube, the extent of mercaptan removal and the turbulence within the pipe. There is no pressure differential applied across the tube, i. e., between the inner and outer walls, so as to prevent a gross flow of liquid from one side to the other. Since the pressure is equalized, the flow of mercaptan through the tube wall proceeds according to the laws of diffusion and adsorption.

The following equilibrium is believed to be set up.

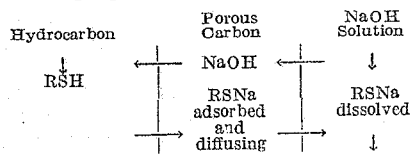

The RSNa should diffuse to the right as it is formed because a concentration gradient is set up in the microporous carbon layer. As the outside layer of carbon on the hydrocarbon side builds up in adsorbed RSNa there is a tendency for the RSNa to desorb into the sodium hydroxide solution around it. The RSNa will in turn be adsorbed by a carbon particle further toward the sodium hydroxide solution on the other surface of the layer and this process of adsorption and desorption will keep up until the RSNa particle has entered the stream of sodium hydroxide where it is removed from the microporous carbon layer.

The following example illustrates application of the invention:

*Example*

A commercial gasoline stock which has not been treated for mercaptan removal and which contains 0.015% total mercaptan sulfur, not identified as to individual mercaptans, is treated in an apparatus similar to that shown in Figure 1. A 20% caustic solution at room temperature is circulated through the central tube which is formed of microporous carbon (⅝ inch inside diameter, pore size 0.0013 inch diameter) while the gasoline stock (at 70–90° F.) is circulated through the steel outer tube (2.730 inch inside diameter).

A 3¾ inch inside diameter microporous carbon tube, 0.0075 inch pore size, can be used as the central tube, in which event a 7.625 inch inside diameter steel tube would be the outer tube.

The treated gasoline from which a major proportion of the mercaptans has been removed is recovered. The spent caustic solution containing the mercaptides is decomposed by oxidation in accordance with the general formula:

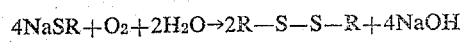

The recovered caustic then is recycled.

This process can be operated continuously without need for intermittent regeneration of the microporous carbon layer.

I claim:

1. An apparatus adapted for continuous operation for the separation of mercaptans from hydrocarbon stock comprising, in combination, a microporous permeable carbon barrier layer disposed between and separating conduit means for flowing hydrocarbon stock in contact with one surface of the layer and conduit means for flowing an aqueous alkali metal hydroxide solution in contact with the opposite surface of the layer.

2. An apparatus in accordance with claim 1 which includes a regenerating unit for spent alkali, means for conducting spent alkali to the regenerating unit, and means for recycling the regenerated alkali.

3. An apparatus in accordance with claim 1 in which the microporous carbon layer is in the form of a tube.

4. An apparatus in accordance with claim 3 in which the layer is in the form of a tube concentrically disposed within an outer tube, the walls of the inner tube being formed of microporous carbon.

5. An apparatus in accordance with claim 1 in which the microporous carbon layer is in the form of a sheet.

6. An apparatus in accordance with claim 1 which includes a multiplicity of microporous carbon layers.

7. An apparatus adapted for continuous operation for the separation of mercaptans from hydrocarbon stocks comprising, in combination, a multiplicity of layers of microporous permeable carbon barrier disposed between and separating conduit means to pass hydrocarbon stock in contact with one surface of the layer and conduit means to pass an aqueous alkali metal hydroxide solution in contact with the opposite surface of the layer, a regenerating unit for spent alkali metal hydroxide, conduit means for passing spent alkali to a regenerating unit and conduit means for recycling regenerated alkali to the said layer.

8. An apparatus in accordance with claim 7 in which the layers of microporous carbon form the walls of tubes concentrically disposed in tubes of larger diameter.

9. An apparatus in accordance with claim 7 which includes a chamber and in which the layers of microporous carbon are in the form of sheets disposed in said chamber and subdivide it into compartments.

10. A process adapted for continuous operation for the separation of mercaptans from mercaptan-containing hydrocarbon stock which comprises flowing the stock in contact with one surface of a microporous permeable carbon barrier layer wet with an aqueous alkali metal hydroxide solution, flowing an aqueous alkali metal hydroxide solution in contact with the opposite surface of the layer, recovering the hydrocarbon stock, conducting spent aqueous alkali metal hydroxide solution to a regenerating unit and recycling recovered aqueous alkali solution to the acid microporous carbon layer.

11. A process in accordance with claim 10 in which the alkali is sodium hydroxide.

12. A process in accordance with claim 10 in which the alkali is potassium hydroxide.

13. A process in accordance with claim 10 in which the hydrocarbon stock is a light petroleum distillate.

References Cited in the file of this patent

UNITED STATES PATENTS

| | | |
|---|---|---|
| 1,818,702 | Flowers | Aug. 11, 1931 |
| 1,890,516 | Lachman | Dec. 13, 1932 |
| 1,895,683 | Roth et al. | Jan. 31, 1933 |
| 2,023,109 | Van Dijck | Dec. 3, 1935 |
| 2,029,748 | Weber | Feb. 4, 1936 |
| 2,577,824 | Stine | Dec. 11, 1951 |